(12) United States Patent
Koelbl

(10) Patent No.: US 11,383,778 B2
(45) Date of Patent: Jul. 12, 2022

(54) DEVICE FOR SUPPORTING A TWO-WHEELED VEHICLE ON A STRUCTURAL PART

(71) Applicant: Ronny Koelbl, Goeppingen (DE)

(72) Inventor: Ronny Koelbl, Goeppingen (DE)

( * ) Notice: Subject to any disclaimer, the term of this patent is extended or adjusted under 35 U.S.C. 154(b) by 204 days.

(21) Appl. No.: 16/959,518

(22) PCT Filed: Jan. 2, 2019

(86) PCT No.: PCT/EP2019/050009
§ 371 (c)(1),
(2) Date: Jul. 1, 2020

(87) PCT Pub. No.: WO2019/134901
PCT Pub. Date: Jul. 11, 2019

(65) Prior Publication Data
US 2021/0053634 A1  Feb. 25, 2021

(30) Foreign Application Priority Data
Jan. 3, 2018  (DE) ..................... 20 2018 100 033.0

(51) Int. Cl.
*B62H 3/04* (2006.01)
*B60P 3/07* (2006.01)
*B62H 3/08* (2006.01)

(52) U.S. Cl.
CPC .................. *B62H 3/04* (2013.01); *B60P 3/07* (2013.01); *B62H 3/08* (2013.01)

(58) Field of Classification Search
CPC ............... B62H 3/04; B60P 3/07; B60P 3/075
USPC ..................... 414/462–466; 211/22; 280/293
See application file for complete search history.

(56) References Cited

U.S. PATENT DOCUMENTS 8,517,343 B1 *  8/2013  VanValkenburgh .... B66F 15/00
254/8 R

FOREIGN PATENT DOCUMENTS

EP             2628635 A1 *  8/2013  ............. B60P 3/075

* cited by examiner

*Primary Examiner* — Lynn E Schwenning
(74) *Attorney, Agent, or Firm* — The Dobrusin Law Firm, PC

(57) ABSTRACT

An apparatus for supporting a two-wheeled vehicle on a structural part has the following features:
 a fork receiving element having recesses for receiving a fork of the two-wheeled vehicle,
 an axle support element for supporting on an axle of the two-wheeled vehicle,
 at least two connecting elements for connecting the fork receiving element to the axle support element, which have respective recesses for receiving the axle support element, and
 at least two means which are arranged at a distance from the recesses for receiving the axle support element for attaching lashing elements by means of which the apparatus can be connected to the structural part.

4 Claims, 3 Drawing Sheets

DEVICE FOR SUPPORTING A TWO-WHEELED VEHICLE ON A STRUCTURAL PART

APPARATUS FOR SUPPORTING A TWO-WHEELED VEHICLE ON A STRUCTURAL PART

The invention relates to an apparatus for supporting a two-wheeled vehicle on a structural part and a transport device for a two-wheeled vehicle.

Drivers of motorcycles or other two-wheeled vehicles tend more and more often to travel to distant places with their vehicle. The two-wheeled vehicle is often loaded onto a transport device or vehicle with a chassis, as the journey to the destination is either too strenuous for the user or the two-wheeled vehicle is not allowed on public roads, for example in the case of off-road or racing motorcycles.

Loading the two-wheeled vehicles is usually very time-consuming, as they have to be reliably connected to the transport vehicle in order to prevent damage during transport. There are many different solutions known from the state of the art.

DE 20 2013 006 043 U1 describes a lashing device for securing the two-wheeled vehicle on the loading area of a vehicle, in which several lashing ropes attached to the two-wheeled vehicle can be tensioned using respective spindles. In the front area of the two-wheeled vehicle, these lashing ropes grip the handlebars, for example, and are hooked on the floor of the transport vehicle. The problem with this procedure, however, is that the springs of the two-wheeled vehicle are subjected to a very high level of force and are thus compressed, which can be problematic for the durability of the springs. A bigger problem, however, is that this causes a compression of the air cushions in the fork, which in turn puts pressure on the oil contained in the fork. This pressure is directed directly onto the sealing elements, in this case the oil seals, and leads to leakage under permanent load, such as during longer transport. This is particularly annoying when it is only discovered at the destination, where repairs to the bike may not be possible or only at very high costs, so that a planned holiday may not be possible. Especially if such a transport of the two-wheeled vehicle is done commercially, this can lead to considerable problems.

DE 20 2017 003 076 U1 describes a rollable and adjustable motorcycle loading aid with which the motorcycle is picked up by its two wheels. A similar solution is also known from DE 10 2008 060 527 A1. However, a fundamental problem when picking up a two-wheeled vehicle in the area of the wheels is that, due to the height of the two-wheeled vehicle, a considerable tilting moment results when the transport vehicle is subjected to a corresponding force, for example when cornering, which makes it practically impossible to transport the two-wheeled vehicle safely.

The solutions described in DE 20 2012 102 505 U1 and EP 2 090 463 A2 also pose similar problems, as here too the two-wheeled vehicle is in principle only picked up by one or both of its wheels.

It is therefore an object of the present invention to create an apparatus for supporting a two-wheeled vehicle on a structural part which ensures a secure connection of the two-wheeled vehicle to the structural part and reliably prevents damage to the two-wheeled vehicle.

According to the invention, this object is solved by the features mentioned in claim 1.

The apparatus according to the invention offers significant advantages over known solutions. For example, the fork receiving element ensures a safe connection of the apparatus to the two-wheeled vehicle, while the mounting of the two-wheeled vehicle in the area of the fork and the associated possibility of a high point of application of force ensures that the two-wheeled vehicle cannot tip over even when high forces are acting on it. This is supported by the means used for attaching the lashing elements, which may also be located in an upper area of the two-wheeled vehicle, thus additionally preventing it from tipping.

These means for attaching the lashing elements, which are directly integrated into the apparatus, can advantageously eliminate the need to introduce the forces required for lashing via the fork, so that forces acting on the fork springs during transport are essentially avoided, which reliably prevents damage to the two-wheeled vehicle and its parts.

The reliable and safe support of the two-wheeled vehicle by the apparatus according to the invention is supported by the axle support element, as this enables a rigid connection between the apparatus and the two-wheeled vehicle, so that correspondingly high forces can be absorbed. The connecting elements ensure the connection between the fork receiving element and the axle support element and thus complete the apparatus which is designed in the form of a frame.

In a very advantageous further development of the invention it may be provided that the means for attaching the lashing elements are arranged on the connecting elements. This makes it possible to create a sufficient distance between the means for attaching the lashing elements and the axle support element so that the two-wheeled vehicle can be securely connected to the corresponding structural part.

If the connecting elements have respective projections on which the means for attaching the lashing elements are arranged, it is possible, on the one hand, to make the connecting elements sufficiently narrow and thus easy to make and, on the other hand, to guarantee sufficient strength in the areas important for the function of the apparatus.

A simple possibility of attaching the lashing elements to the apparatus according to the invention results, if it is further provided that the means for attaching the lashing elements are designed as recesses. In this way, the lashing elements can be hooked into the recesses, for example by means of corresponding hooks or similar.

If the fork receiving element is formed in two parts and the recesses for receiving the fork of the two-wheeled vehicle are each formed semi-circular, this provides a simple means of mounting the fork receiving element on the fork.

Furthermore, it can be provided that the fork receiving element is connected to the connecting elements by means of respective connecting bolts. This enables a simple assembly of the connecting elements to the fork receiving element and a secure connection of these components.

In order to hold the apparatus permanently and securely in its position fixing the two-wheeled vehicle, it may also be provided that the connecting pins are secured by means of respective locking pins.

A simple design of the axle support element is obtained, if it is designed as a bolt which can be passed through the axle of the two-wheeled vehicle. In this way, it is also possible to install the apparatus easily.

It may be provided that the axle support element can be locked in position by means of respective locking pins. This makes it easy to securely fix the apparatus in its position holding the two-wheeled vehicle.

In order to enable the apparatus to be adapted to different types of two-wheeled vehicles, it may further be provided that spacer elements are arranged on the axle support element for abutment on the connecting elements and on the fork of the two-wheeled vehicle.

If respective protective elements are arranged in the recesses in the fork receiving element, damage to the fork is prevented at any stage during transport of the two-wheeled vehicle with the apparatus of the invention.

A simple design of these protective elements is obtained when they are made of felt and are glued to the fork receiving element.

A further adaptation of the apparatus to different configurations of two-wheeled vehicles can be achieved, if the connecting elements have respective recesses for adaptation to the shape of the fork of the two-wheeled vehicle.

A further advantageous design of the invention may be that at least the fork receiving element and the connecting elements are made of an aluminium material. This results in a light, robust and corrosion-protected design of the apparatus.

Claim 15 specifies a transport device for a two-wheeled vehicle with a chassis, a structural part and an apparatus according to the invention.

By means of this transport device, two-wheeled vehicles can be easily and safely transported to different places.

The following is an embodiment of the invention based on the drawing.

Figure 1:
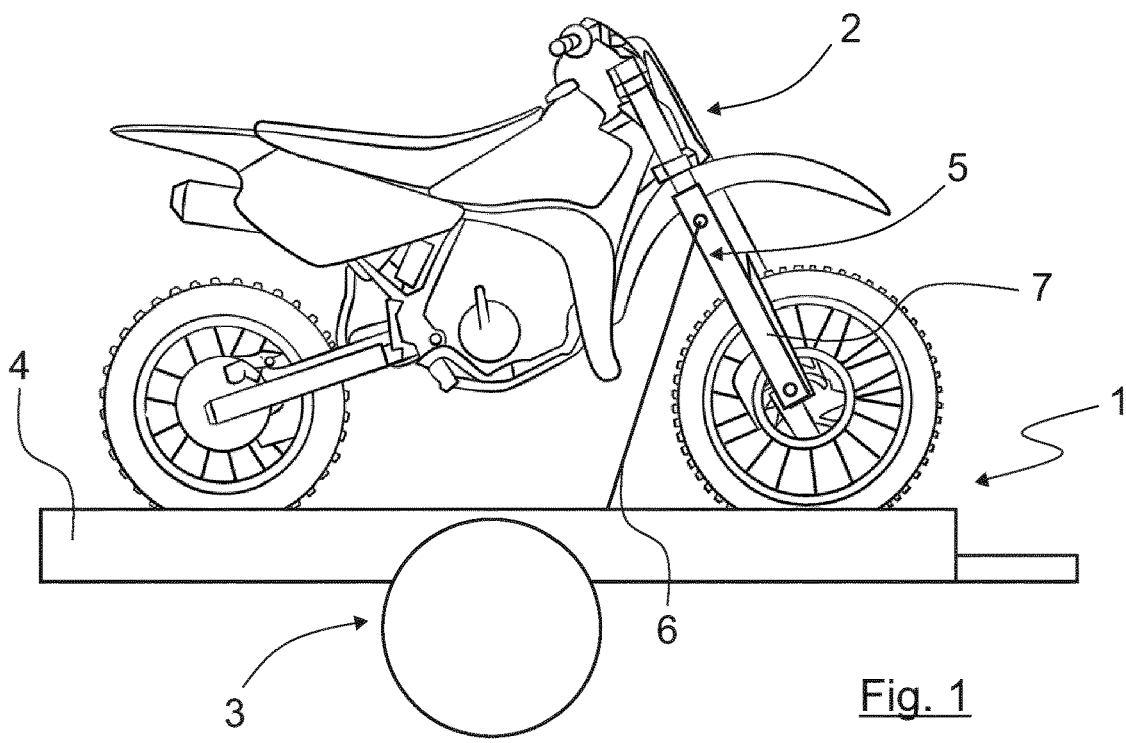
FIG. 1 shows a very schematic view of a transport device according to the invention.

FIG. 1 shows a transport device 1 for a two-wheeled vehicle 2, which has a chassis 3, a structural part 4 and an apparatus 5 for holding or supporting the two-wheeled vehicle 2 on the structural part 4. In the present case the transport device 1 is a trailer, but it would also be possible to use a van, a rail vehicle or similar as the transport device 1. Furthermore, structural part 4 is designed as the base plate of transport device 1. Here too, it would be possible to use other structural parts to attach the two-wheeled vehicle 2 to it with the help of apparatus 5. For example, with the help of apparatus 5 the two-wheeled vehicle 2 can also be attached to a lifting platform or similar.

Also, the two-wheeled vehicle 2, which in this case is an off-road motorcycle, is only to be considered as an example and, in principle, any two-wheeled vehicle 2 can be attached to the structural part 4 with the aid of apparatus 5, although appropriate adjustments to apparatus 5 may be necessary.

Figure 2:
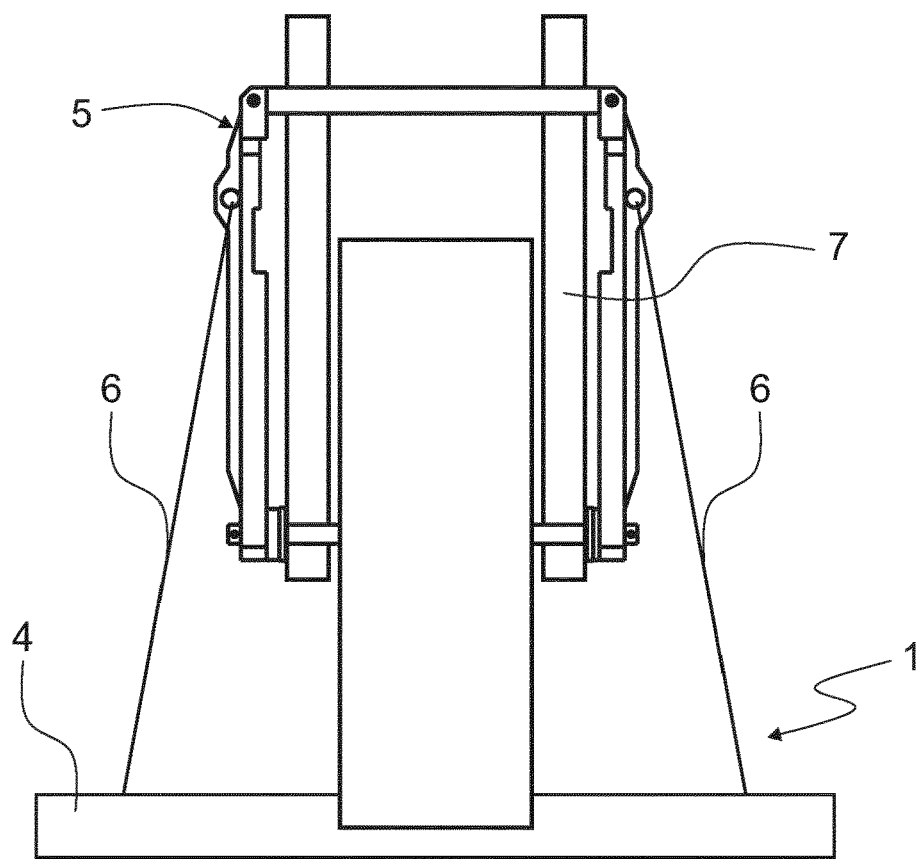
FIG. 2 shows a schematic front view of the transport device.
Figure 3:
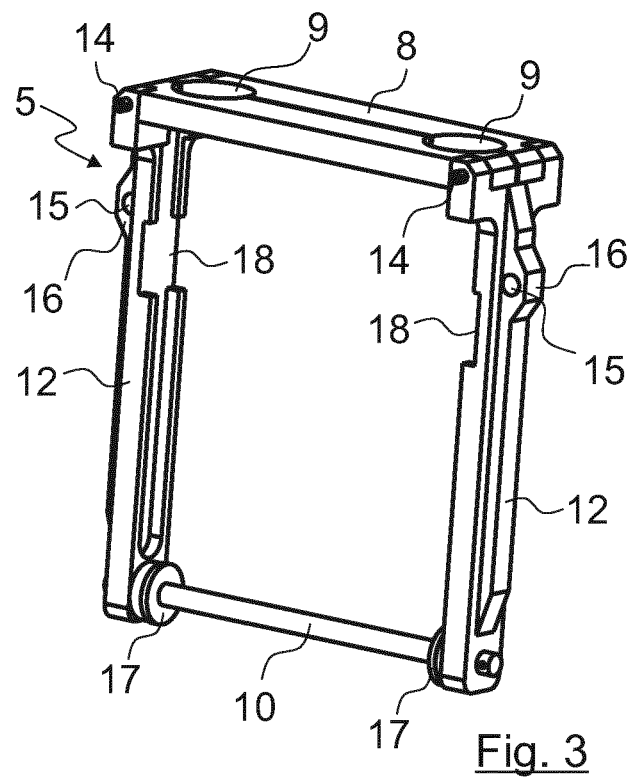
FIG. 3 shows a perspective view of the apparatus according to the invention.
Figure 4:
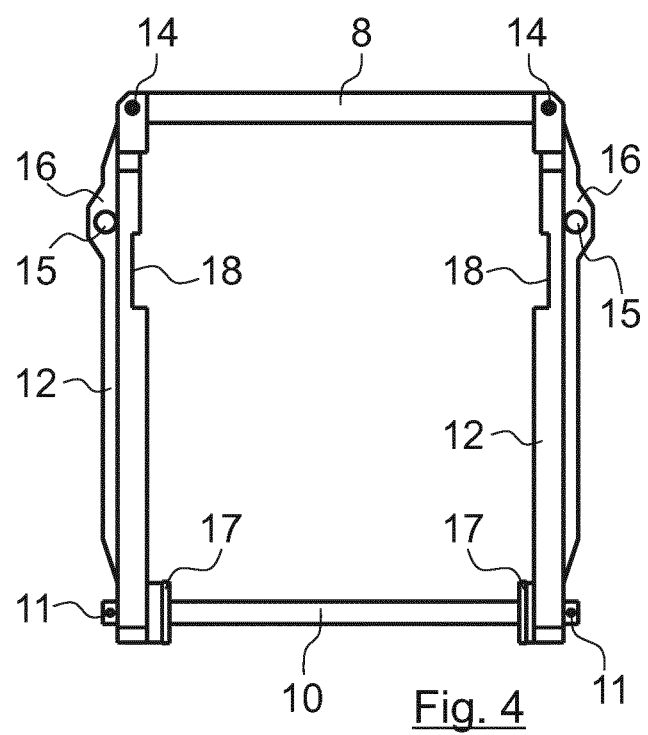
FIG. 4 shows a front view of the apparatus according to the invention.

The apparatus 5 is connected to the structural part 4 by means of several lashing elements 6, one of which is shown in FIG. 1. FIG. 2 shows a schematic front view of the transport device 1, from which the arrangement of the apparatus 5 opposite a fork 7 of the two-wheeled vehicle 2 can be seen. The point of application of the lashing elements 6, of which preferably two, i.e. one on each side of the two-wheeled vehicle 2, are provided, can also be seen in FIGS. 1 and 2.

Figure 5:
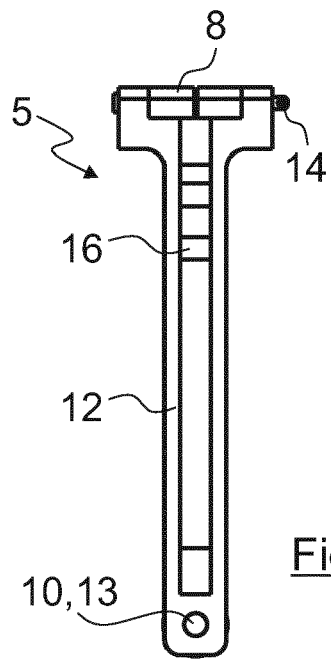
FIG. 5 shows a side view of the apparatus according to the invention.
Figure 6:
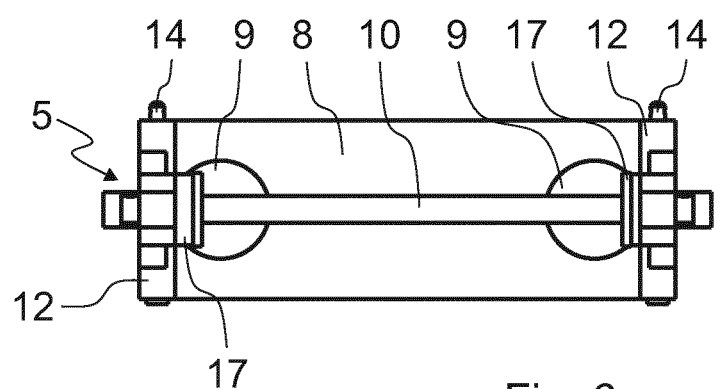
FIG. 6 shows a bottom view of the apparatus according to the invention.
Figure 7:
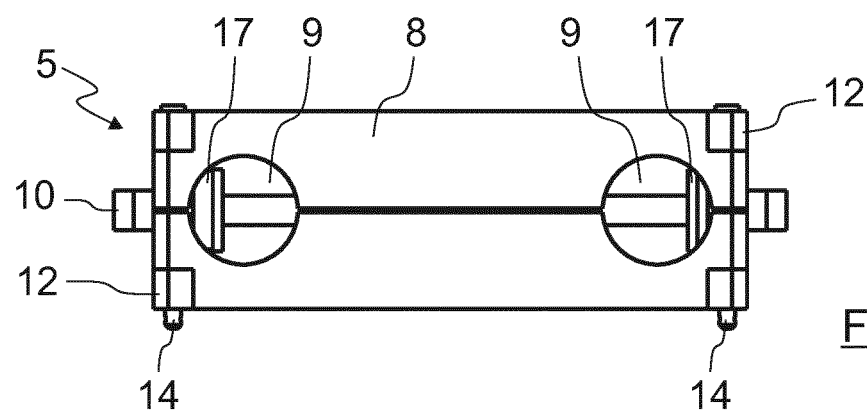
FIG. 7 shows a top view of the apparatus according to the invention.

FIGS. 3 to 7 show the apparatus 5 with its individual components in detail. The apparatus 5 has a fork receiving element 8 in its upper part, which has recesses 9 shown in FIGS. 3, 6 and 7, which serve to receive the fork 7 of the two-wheeled vehicle 2. The fork receiving element 8, as can be seen in particular in FIG. 5, is constructed in two parts and the recesses 9 are each of a semi-circular design, so that when the two parts of the fork receiving element 8 are arranged next to each other, as shown in FIG. 7, two circular recesses 9 are produced, through which the fork 7 can be passed.

When mounting the fork receiving element 8 on the fork 7, the two parts of the fork receiving element 8 are brought together from both sides with the fork 7 being located between them, so that the two holms of the fork 7 are received in the two recesses 9.

In the recesses 9 in the fork receiving element 8 there may be protective elements not shown, which may for example be made of felt and can be glued to the fork receiving element 8. The protective elements allow the fork receiving element 8 to be attached to the fork 7 without play and at the same time prevent damage to the fork 7.

On the side opposite to the fork support 8, i.e. on the underside of the apparatus 5, an axle support element 10 is provided to support the apparatus 5 on an axle of the front wheel of the two-wheeled vehicle 2 which is not shown. In the present case, the axle is a hollow axle through which the axle support element 10 in the form of a bolt passes. The axle support element 10 can be locked in position on both sides by means of respective locking pins 11 inserted through corresponding holes in the axle support element 10.

Two connecting elements 12 running in the vertical direction serve to connect the fork receiving element 8 to the axle support element 10. These connecting elements have respective recesses 13, which in the present case are designed as through-bores, for receiving the axle support element 10 or, in the present case, for passing it through. The connecting elements 12 can be connected on their upper side to the fork receiving element 8 by means of respective connecting bolts 14. The connecting bolts 14 are preferably secured by means of respective locking pins not shown. The locking pins for securing the connecting bolts 14 can be designed similar to the locking pins 11 by means of which the axle support element 10 is locked in its position. Instead of the connecting bolts 14, screws can also be used to connect the connecting elements 12 to the fork receiving elements 8. However, the use of the connecting bolts 14 makes it easy to fit the apparatus 5 to the two-wheeled vehicle 2.

On the connecting elements 12 there are respective means 15 for attaching the lashing elements 6. The means 15 are arranged at a distance from the recesses 13 for the passage of the axle support element 10. In this way, a sufficiently high force application point of the lashing elements 6 on the apparatus 5 is achieved. In the embodiment shown, the connecting elements 12 have respective projections 16 in which the means 15 for attaching the lashing elements 6 are arranged. In the present case, the means 15 are recesses into which hooks arranged on the lashing elements 6 can be inserted, for example.

In the present case, the means 15 are arranged on the connecting elements 12, since the connecting elements 12 are particularly easily accessible. In principle, however, it would also be possible to attach the means 15 for attaching the lashing elements 6 to the fork receiving element 8.

On the axle support element 10, respective spacer elements 17 are arranged for attachment to the connecting elements 12 on the one hand and to the fork 7 of the two-wheeled vehicle 2 on the other. Any play between the components is taken up by the spacer elements 17, which have respective bores for passing through the axle support element 10.

In the present case the connecting elements 12 have recesses 18 to adapt to the shape of the fork 7 of the two-wheeled vehicle 2. The size and shape of the recesses 18 can be chosen so that the connecting elements 12 are at a sufficient distance from the fork 7. Of course, the dimensions of the other components of the apparatus 5 can also be adapted to different sizes or shapes of the respective two-wheeled vehicle 2. In this way the apparatus 5 can be used for very sport-oriented motorcycles, which are mainly ridden on race tracks, for so-called naked bikes or also for off-road or cross motorcycles. For example, off-road motorcycles or naked bikes may require the connecting elements 12 to be longer than for sports or racing motorcycles. Furthermore, if necessary, the outer diameter of the axle support element 10 can be adapted to the inner diameter of the axle of the two-wheeled vehicle 2.

The fork receiving element 8, the connecting elements 12 and, if necessary, the axle support element 10 can be made of an aluminium material. Of course, other materials can also be used for this.

In the present case, all parts of the apparatus 5 are manufactured from a solid material by milling, but it would in principle also be possible to manufacture these parts by means of die casting or another suitable process. A combination of several processes is also possible, of course.

The invention claimed is:

1. An apparatus for supporting a two-wheeled vehicle on a structural part, having the following features:
   a fork receiving element having recesses for receiving a fork of the two-wheeled vehicle,
   an axle support element for supporting on an axle of the two-wheeled vehicle,
   at least two connecting elements for connecting the fork receiving element to the axle support element, which have respective recesses for receiving the axle support element, and
   at least two means which are arranged at a distance from the recesses for receiving the axle support element for attaching lashing elements by means of which the apparatus can be connected to the structural part;
   wherein the means for attaching the lashing elements are arranged on the connecting elements.

2. Apparatus according to claim 1,
   wherein the connecting elements have respective projections on which the means for attaching the lashing elements are arranged.

3. An apparatus for supporting a two-wheeled vehicle on a structural part, having the following features:
   a fork receiving element having recesses for receiving a fork of the two-wheeled vehicle,
   an axle support element for supporting on an axle of the two-wheeled vehicle,
   at least two connecting elements for connecting the fork receiving element to the axle support element, which have respective recesses for receiving the axle support element, and
   at least two means which are arranged at a distance from the recesses for receiving the axle support element for attaching lashing elements by means of which the apparatus can be connected to the structural part;
   wherein the fork receiving element is formed in two parts, wherein the recesses for receiving the fork of the two-wheeled vehicle are each formed in a semi-circular shape.

4. An apparatus for supporting a two-wheeled vehicle on a structural part, having the following features:
   a fork receiving element having recesses for receiving a fork of the two-wheeled vehicle,
   an axle support element for supporting on an axle of the two-wheeled vehicle,
   at least two connecting elements for connecting the fork receiving element to the axle support element, which have respective recesses for receiving the axle support element, and
   at least two means which are arranged at a distance from the recesses for receiving the axle support element for attaching lashing elements by means of which the apparatus can be connected to the structural part;
   wherein the connecting elements have respective recesses for adaptation to the shape of the fork of the two-wheeled vehicle.

* * * * *